United States Patent [19]

Nakazima

[11] Patent Number: 4,500,374

[45] Date of Patent: Feb. 19, 1985

[54] DISPLAY PANEL AND PROCESS FOR FORMING PATTERN THEREFOR

[76] Inventor: Shigeko Nakazima, 4-11-7, Nishiogi Minami, Suginami-ku, Tokyo, Japan

[21] Appl. No.: 400,382

[22] Filed: Jul. 21, 1982

[30] Foreign Application Priority Data

Sep. 14, 1981 [JP] Japan .............................. 56-145085

[51] Int. Cl.[3] ........................ B32B 31/02; B44C 1/04; C09J 5/00; G09F 19/00

[52] U.S. Cl. ........................................ 156/83; 156/85; 156/230; 156/240; 156/300; 156/305; 156/154; 264/342 R; 40/615

[58] Field of Search ..................... 156/154, 83, 84, 85, 156/240, 241, 229, 230, 300, 305; 264/139, 342 R; 40/615

[56] References Cited

U.S. PATENT DOCUMENTS

| | | | |
|---|---|---|---|
| 4,105,483 | 8/1978 | Lin | 156/154 |
| 4,231,829 | 11/1980 | Marui et al. | 156/240 |
| 4,263,077 | 4/1981 | Rampelberg | 156/240 |

*Primary Examiner*—Edward Kimlin
*Assistant Examiner*—Louis Falasco
*Attorney, Agent, or Firm*—Sherman & Shalloway

[57] ABSTRACT

A display panel comprising a plurality of printing ink layers having the same patterns one another being formed on the surface of a transparent substrate by means of transferring operation and a semi-opaque layer existing among the printing ink layers adjacent to each other; a display panel obtained by forming a pattern involving arbitrary characters, figures or pictures on the surface of a substrate by means of transferring technique; and a process for forming such pattern.

12 Claims, 3 Drawing Figures

DISPLAY PANEL AND PROCESS FOR FORMING PATTERN THEREFOR

BACKGROUND OF THE INVENTION

1. Field of the Invention

The present invention relates to a transmitting display panel employed for various displaying purposes or advertisement and the like purposes, and particularly to a display panel in which a display pattern involving characters, figures or pictures is formed on a transparent substrate in accordance with transferring technique as well as a process for forming such pattern.

2. Description of the Prior Art

A display panel provided with a plurality of printing ink layers on the substrate thereof can be produced in such a way that a transfer sheet in which a printing ink layer is formed on a pulpboard sheet by the use of a water-resistant printing ink in accordance with printing operation is bonded to the transparent substrate by utilizing an adhesive so as to closely adhere the printing ink layer to the back of the substrate; thereafter, the pulpboard sheet is dissolved and removed to leave the printing ink layer, and further such transferring operation is repeated by a required number of times. This type of display panel has an equivalent clear picture to that of a printing paper, besides the display panel has favorable transmission, water resistance, shape retention and the like so that such display panel is suitable for the use of illuminating advertisement board and the like. However, in such display panel, there are many cases where rainbow-like design appears in a fine pattern such as textile or a part of half tone such as flesh color so that displaying effects of the display panel decrease.

It is difficult to apply a process for forming an arbitrary pattern on the surface of an article made from most plastic material which does not absorb printing ink. Furthermore a pattern formed on the surface of such article by means of printing operation is inferior to a pattern printed on a paper sheet from the viewpoints of fineness, color tone and the like. Application of photographic technique is practised for the same purpose, but a pattern formed by developing a sensitized material is remarkably unfavorable in the discoloration thereof so that its initial quality cannot be maintained for a long period of time.

SUMMARY OF THE INVENTION

A principal object of the present invention is to provide a useful display panel by which the above described disadvantages of a conventional display panel can be eliminated as well as a process for producing the same.

Another object of the present invention is to provide a display panel in which no rainbow-like design appears on the surface of a substrate unlike the above-mentioned case and favorable displaying effects are always attained.

A further object of the present invention is to provide a process for forming a pattern of high quality on such a substrate made from a material to which application of printing operation is difficult.

DESCRIPTION OF A PREFERRED EMBODIMENT

Embodiments of the present invention will be described in detail hereinbelow by referring to the accompanying drawing.

Figure 1:
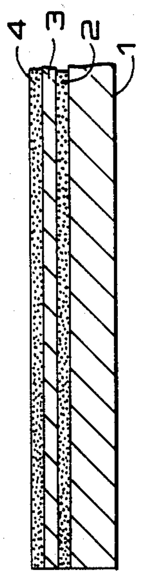
FIG. 1 is a longitudinal sectional view showing a part of the display panel according to the present invention.

FIG. 1 is a longitudinal sectional view showing a part of the display panel according to the present invention in which a first printing ink layer 2, a semi-opaque layer 3 and a second printing ink layer 4 are successively superposed in this order on the back of a transparent substrate 1 made of a plastic material such as acrylic resin. The first printing ink layer 2 is formed in accordance with such ordinary transfer technique that a transfer sheet having a printing ink layer printed on the surface of a usual pulpboard sheet by the use of a water-resistant printing ink is bonded to the substrate 1 in such a manner that the printing ink layer adheres to the surface of the substrate 1 by utilizing an adhesive, and then only the pulpboard sheet is removed by means of a suitable dissolving agent (for example, aqueous caustic potash solution).

Furthermore, the semi-opaque layer 3 can be formed on the first printing layer 2 by either such a manner that an ordinary coating material consisting of, for instance, acrylic resin, polyol, aluminium silicate, titanium oxide and thinner is applied on the first printing ink layer 2 with a suitable thickness, and then the coating material thus applied is dried, or bonding a semi-opaque sheet made of a plastic material such as acrylic resin to the first printing ink layer 2. Thereafter, the second printing ink layer 4 is formed on the semi-opaque layer 3 in accordance with a similar manner to that of the case of the first printing ink layer 2. In case of utilizing a semi-opaque plastic sheet for forming the semi-opaque layer 3, such formation may be carried out in such a way that the first printing ink layer 2 as well as the second printing ink layer 4 have previously been formed on the substrate 1 and the semi-opaque sheet, respectively, and then both the resulting sheet materials are bonded to each other.

A display panel having such a construction as mentioned above is utilized in such condition that a light source such as a fluorescent lamp,or the like is placed on the back side (the second printing ink layer 4 side) of the display panel. Light emitted from the light source transmits successively the second printing ink layer 4, the semi-opaque layer 3, the first printing ink layer 2 and the substrate 1 to display a prescribed display pattern on the surface of the display pannel, but the light is subjected to slight scattering action by means of the semi-opaque layer 3 during the progress thereof from the second printing ink layer 4 to the first printing ink layer 2. For this reason, the deviation relating to printed screen existing between the first printing ink layer 2 and the second printing ink layer 4 is cancelled so that a rainbow-like pattern does not appear on the final pattern appeared on the surface of the substrate 1.

Figure 2:
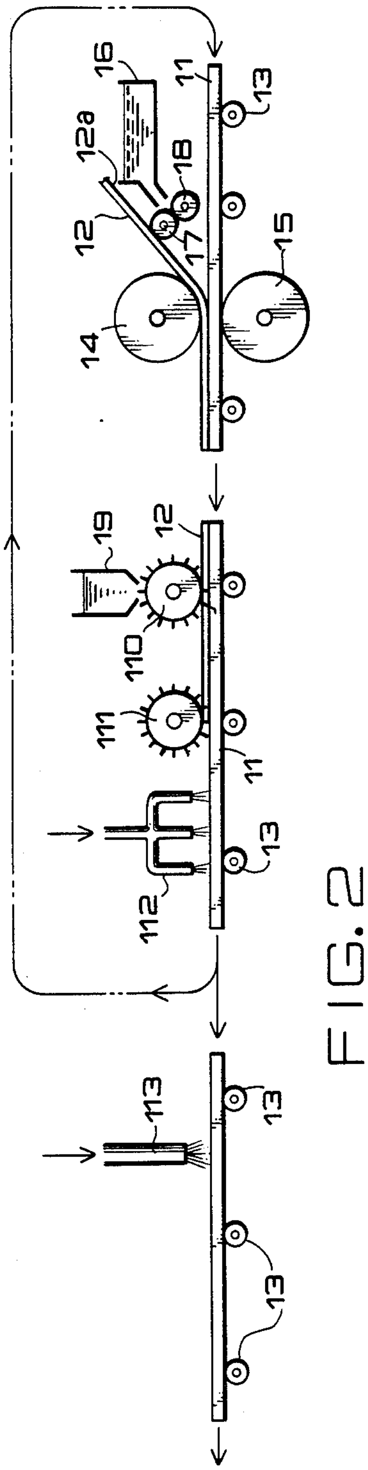
FIG. 2 is a schematic side elevational view for explaining the process according to the present invention by utilizing a system for carrying out the transferring operation.

Next, a process for forming a pattern to be utilized for the aforesaid display panel will be described by referring to FIGS. 2 and 3 wherein a transparent substrate 11 made of a plastic material such as acrylic resin is introduced between a pair of pressure rollers 14 and 15 along a conveying surface defined by a plurality of rollers 13 disposed in parallel to each other. On one hand, a transfer sheet 12 is provided with an arbitrary pattern formed on either side of a pulpboard sheet by utilizing a water-resistant printing ink. In the present invention, since two or more transfer sheets having the same patterns are required, it is desirable to form such patterns on a transfer sheet by means of printing operation. The transfer sheet is introduced between the pressure rollers 14 and 15 in such a manner that the surface, on which a printing ink layer forming the pattern has been provided, i.e., the right side of the transfer sheet faces the substrate 11. In the transfer sheet, employed in the present embodiment, a retention film 12*a* produced from a coating material or an adhesive comprising a material having affinity for the printing ink, for example, polyvinyl chloride and a solvent therefor has previously been provided on the surface of the transfer sheet. Thus, the printing ink layer adheres on the pulpboard sheet and at the same time, the layer is also bonded firmly to the retention film 12*a*.

An adhesive is applied to both the surfaces of the substrate 11 and the retention film 12*a* of the transfer sheet 12 in the immediately prior stage where the transfer sheet 12 is fed between the pressure rollers 14 and 15. As a result, the substrate 11 is bonded to the transfer sheet 12 in such a state that they are contacted with each other so as to sandwich both the printing ink layers thereof between the substrate and transfer sheet at the time when they passed through the clearance between the pressure rollers 14 and 15. In the embodiment illustrated in FIG. 2, coating rolls 17 and 18 are used for applying the adhesive supplied from a container 16 on the substrate 11 and the transfer sheet 12, respectively. In place of the adhesive, a solvent for the plastic material constituting the retention film 12*a* may be employed, and such solvent dissolves a part of the retention film 12*a* in the case where the solvent is applied on the surface of the retention film 12*a* so that the same condition as that in case of newly applying the adhesive on the surface of the pulpboard sheet is presented. If necessary, a coating material or an adhesive consisting of the same materials as those of the retention film 12*a* may have previously been also applied on the surface of the substrate 11. A laminate produced from the substrate 11 and the transfer sheet 12 by passing through the clearance between the pressure rollers 14 and 15 is subjected to application of a dissolving solution for pulp, for example, 0.9% aqueous caustic potash solution supplied from a tank 19 through a roll brush 110 in a process for conveying the laminate on the rollers 13, and then the resulting laminate is subjected to a scraping action by means of a roll brush 111. In this process, the pulpboard sheet of the transfer sheet is dissolved and stripped, and the pulpboard sheet thus dissolved and stripped is washed down by means of a cleaning fluid jetted from a spraying means 112. As a consequence, a part of the printing ink supported by the transfer sheet 12 remains on the substrate 11 together with a very small amount of pulp fibers. However, an amount of the printing ink which is transferred from the transfer sheet 12 to the substrate 11 by means of one transfer cycle is not so much, and hence a concentration or contrast of the pattern formed herein is not sufficient. In this respect, transfer is again carried out upon the substrate 11 onto which another transfer has already been completed in accordance with similar operation to that mentioned above, and such transfer process is repeated until a desired concentration or contrast of the pattern is obtained in the present invention.

In this connection, it is important that the pattern which has already been formed on the substrate 11 has an identical dimension to that of the pattern contained in the transfer sheet 12 in the case where the following transfer is carried out with respect to the substrate 11 having already the pattern which had been transferred in the preceding process. If there is a dimensional difference between both the patterns, two printing ink layers formed by means of two transferring cycles in the resulting pattern do not coincide exactly with each other so that clarity or resolution of the final pattern becomes low. Such dimensional difference arises due to expansion or shrinkage of either or both of the substrate and the transfer sheet derived from the application of an adhesive, change in ambient temperature and the like. In the present invention, such inconsistency in the patterns due to the change in dimension as described above can be prevented by intentionally expanding or shrinking either or both of the substrate 11 and the transfer sheet 12. Expansion or shrinkage of the substrate 11 can be effected by immersing the substrate in a water bath a temperature of which is maintained at a suitable temperature, whilst expansion or shrinkage of the transfer sheet 12 can be attained by controlling a water content thereof. In principle, such coincidence in dimensions of patterns can be attained by either shrinking a member having a larger dimension than that of the other member between the substrate 11 and the transfer sheet 12, or expanding a member having a smaller dimension than that of the other member between both of them. Generally speaking, however, expansion of these members is more easy than shrinkage of them, and cancellation for the change in dimension is also uniformly effected in this case. The easiest process for expanding the transfer sheet 12 is to jet steam onto the transfer sheet. Expansion of the transfer sheet 12 arises also by means of applying an adhesive or a solvent on the retention film 12*a*. Accordingly, temperature and humidity in the atmosphere are kept constant, and adhesion of the retention film 12*a*, on which an adhesive or a solvent has been applied, to the substrate 11 is carried out after the elapse of a certain period of time from the application of such adhesive or solvent so that coincidence in dimensions of patterns can also be attained.

A transferred film involving sufficient number of printing ink layers for forming a pattern having a desirable concentration or contrast is formed on the surface of the substrate 11 which has already been subjected to a required number of transferring operations. According to the present invention, a coating material is sprayed on the transferred film from a spray nozzle 113. The coating material consists of, for example, emulsion of acrylonitrilostyrene copolymer and finely divided particles of titanium white dispersed thereinto, and as a consequence an opaque white, translucent and colored film is formed after drying the film coated.

Figure 3:
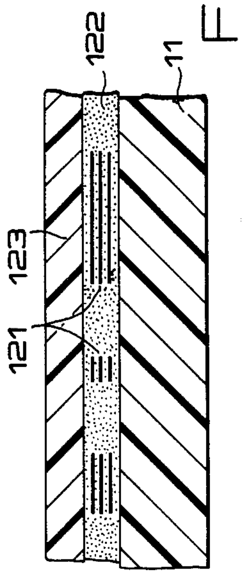
FIG. 3 is a constructional view, partly in longitudinal section, showing a panel obtained through pattern formation by utilizing the system of FIG. 2.

FIG. 3 is a view, partly in longitudinal section, showing a panel having a transferred pattern obtained in accordance with the present invention in which reference numeral 11 designates a substrate, 121 a printing ink layer, 122 an adhesive layer, and 123 a colored film, respectively. In this arrangement, when viewed from the surface of the substrate 11 (the under surface in FIG. 2), a pattern having a sufficient concentration (or contrast) and a high clarity (resolution) appears on the substrate, if a plurality (three layers in this embodiment) of the printing ink layers 121 are placed on the coincident positions with precision. The colored film 123 bonded closely to the printing ink layers 121 provides a favorable background for the pattern formed by the printing ink layers 121. Furthermore, when the panel is illuminated through the surface provided with the colored film 123, such visual effect that as if the pattern formed by the printing layers 121 comes up to the surface is given because of favorable light scattering effect of the colored film 123.

It is preferable that the colored layer 123 is translucent as mentioned above, but an opaque colored layer 123 may also be employed in the case where the panel is viewed by means of only reflection of the light emitted from the front thereof. It is also possible to directly overlap and bond the ink layers 1, 2 and the ink layer 4, and spray a semitransparent liquid on the layers to form a milky layer thereon. Such opaque colored layer 123 can be formed by, for instance, the application of a white paint.

For any type of materials, it is important that the colored layer 123 is closely bonded to the surface of the adhesive layer 122 with no gap. To attain favorable adhesion, concentration or contrast of the pattern formed by the printing ink layers 121 is remarkably elevated as compared with the case where a semi-opaque or opaque sheet which has separately been prepared from the panel is superposed on the adhesive layer. Accordingly, a clear pattern is recognized in respect of a construction involving the same number of the printing ink layers 123 as that of semi-opaque or opaque sheets. In addition, a smaller number of the printing ink layers 123 than that of the semi-opaque or opaque sheets is required for obtaining a concentration or contrast of the same degree in case of forming the pattern by means of the printing ink layers 123, and therefore such case is advantageous from the viewpoint of costs.

As described above, according to the present invention, such advantages that there is no generation of rainbow-like design being peculiar to a transfer display panel formed by superposing a plurality of printing ink layers on one another, that a fine picture can clearly be displayed, besides that half tone such as flesh color can also be expressed with high fidelity can be attained. Furthermore, even in the case where the light source is switched off, the display panel of the present invention exhibits display effect of the same degree as that of a printing paper although it is slightly inferior to the case of the printing paper in the contrast thereof because of reflecting action of the semi-opaque layer in the display panel of the invention.

Moreover, according to the present invention, a formation of pattern on a substrate is carried out by utilizing a transfer sheet having the pattern formed on a pulpboard sheet by means of a water-resistant or hydrophobic printing ink. A water-resistant retention film having affinity for the printing ink is disposed on the surface, having printing ink layers, of the transfer sheet prior to the transferring operation thereof. Such operation for the transfer involves a step for bonding a protective film for a transfer sheet to the substrate and a step for removing a paper sheet of the transfer sheet to only leave the protective film and the printing ink layers, and the operation is repeated by a required number of times sufficient for forming the pattern having a desired concentration or contrast on the substrate. In the respective transferring operations, it is important that the pattern which has already been formed on a substrate has the same dimension as that of the pattern of a transfer sheet which will be bonded to the substrate one another. Adjustment of such dimension can be effected by shrinking or expanding either of the substrate and transfer sheet. Further it is also possible to make the substrate and the transaction sheet into the same area to some extent by way of natural dry of averaging the circumferential temperature and adjusting the treating time.

Thus, a colored layer having an arbitrary color tone is provided on the surface of the printing ink layers disposed on either of the surfaces of the substrate. Such colored layer does not only protect the printing ink layers, but also elevate remarkably clarity of the pattern, when viewed from the surface of the substrate, that is, the surface being reverse to that provided with the printing ink layers.

What is claimed is:

1. A process for forming patterns in accordance with transferring operations comprising the steps of forming on the surface of a transfer sheet a water - resistant retention film having there on a layer of a water - resistant printing ink formed into an arbitrary pattern, said retention film having affinity for said printing ink, said transfer sheet comprising a pulpboard sheet; bonding said transfer sheet to the surface of a substrate, with said retention film facing the surface of said substrate; applying a pulp dissolving solution on the pulpboard to dissolve said pulpboard; scraping the pulp of said pulpboard to leave said retention film and said printing ink layer on said substrate; expanding or shrinking at least one member of said substrate and said transfer sheet so as to coincide the pattern so formed on said substrate with the pattern on another transfer sheet; repeating the above described steps to transfer a plurality of printing ink layers on said substrate; and providing a colored film adhering closely to the surface of said printing ink layers thereon after completing the last transferring step.

2. The process as claimed in claim 1, wherein said substrate is made from a plastic material.

3. The process as claimed in claim 1, wherein said patterns on said transfer sheet are formed by means of a printing operation in advance.

4. The process as claimed in claim 3, wherein on said transfer sheet, there has previously been formed a retention film produced from a coating material or adhesive comprising a material having affinity for the printing ink.

5. The process as claimed in claim 4, wherein said printing ink comprises polyvinyl chloride and a solvent therefor.

6. The process as claimed in claim 1, wherein a paint or an adhesive having the same material as that of said retension film is coated on said substrate.

7. The process as claimed in claim 1, wherein said pulp dissolving solution is 0.9% aqueous caustic potash solution.

8. The process as claimed in claim 1, wherein said expansion or shrinkage of said transfer sheet is attained by controlling the water content thereof.

9. The process as claimed in claim 8, wherein said expansion of said transfer sheet is attained by jetting steam onto the transfer sheet.

10. The process as claimed in claim 8, wherein said expansion of said transfer sheet is attained by keeping temperature and humidity in the atmosphere constant and by carrying out adhesion of said retention film to said substrate after the elapse of a certain period of time from the application of an adhesive or a solvent to the retention film.

11. The process as claimed in claim 1, wherein a coating material is sprayed on the transferred film from a spray nozzle, said coating material comprising an emulsion of acrylonitrilostyrene copolymer and finely divided particles of titanium white dispersed thereinto.

12. The process as claimed in claim 1, wherein said colored film is translucent or opaque.

* * * * *

UNITED STATES PATENT AND TRADEMARK OFFICE

CERTIFICATE OF CORRECTION

PATENT NO. : 4,500,374

DATED : February 19, 1985

INVENTOR(S) : SHIGEKO NAKAZIMA

It is certified that error appears in the above-identified patent and that said Letters Patent is hereby corrected as shown below:

Claim 6, line 3, delete "retension", insert --retention--.

Signed and Sealed this

*Twenty-third* Day of *July 1985*

[SEAL]

*Attest:*

DONALD J. QUIGG

*Attesting Officer* *Acting Commissioner of Patents and Trademarks*